United States Patent
Stemmer et al.

(10) Patent No.: US 12,059,322 B2
(45) Date of Patent: Aug. 13, 2024

(54) METHOD OF IDENTIFICATION OF POSITIONING OF AN IMPLANT FOR DENTAL RESTORATION

(71) Applicants: Armand Stemmer, Paris (FR); EUROTEKNIKA, Sallanches (FR)

(72) Inventors: Armand Stemmer, Paris (FR); Théo Leger, Domancy (FR); Benjamin Calvat, Ugine (FR); Cédric Lancieux, Cordon (FR)

(73) Assignees: Armand Stemmer, Paris (FR); EUROTEKNIKA, Sallanches (FR)

( * ) Notice: Subject to any disclaimer, the term of this patent is extended or adjusted under 35 U.S.C. 154(b) by 0 days.

(21) Appl. No.: 17/860,865

(22) Filed: Jul. 8, 2022

(65) Prior Publication Data

US 2022/0338962 A1  Oct. 27, 2022

Related U.S. Application Data

(62) Division of application No. 15/522,891, filed as application No. PCT/EP2015/074476 on Oct. 22, 2015, now abandoned.

(30) Foreign Application Priority Data

Oct. 29, 2014 (FR) ........................... 1460368
Nov. 12, 2014 (FR) ........................... 1460889

(51) Int. Cl.
*A61C 8/00* (2006.01)
*A61C 9/00* (2006.01)

(52) U.S. Cl.
CPC ............ *A61C 8/008* (2013.01); *A61C 8/0001* (2013.01); *A61C 8/0074* (2013.01); *A61C 9/004* (2013.01); *A61C 8/005* (2013.01)

(58) Field of Classification Search
CPC ..... A61C 8/008; A61C 8/0016; A61C 8/0066; A61C 8/0068; A61C 8/0069; A61C 8/0089
(Continued)

(56) References Cited

U.S. PATENT DOCUMENTS

| 4,547,157 A | 10/1985 | Driskell |
| 5,154,612 A | 10/1992 | Carlsson et al. |

(Continued)

FOREIGN PATENT DOCUMENTS

| CA | 2833215 A1 | 11/2012 |
| CN | 101803957 A | 8/2010 |

(Continued)

OTHER PUBLICATIONS

International Search Report and Written Opinion dated Jan. 26, 2016 in application No. PCT/EP2015/074476 corresponding to parent U.S. Appl. No. 15/522,891; w/ English partial translation and partial machine translation (total 26 pages).

(Continued)

*Primary Examiner* — Ralph A Lewis
*Assistant Examiner* — Mirayda A Aponte
(74) *Attorney, Agent, or Firm* — Seckel IP, PLLC

(57) ABSTRACT

The method of detection of positioning of a dental implant for dental restoration involves taking a manual or digital impression of the buccal space, including a cicatrisation element secured to the implant and having an emergent surface outside the gum, and automatically detecting the positioning of the implant by identifying (i) the axis of the implant corresponding to an axis of the cicatrisation element identified by the geometry of the emergent surface or association with a cicatrisation element memorized in a database; (ii) the orientation of the implant by the orientation of the emergent surface or association with a cicatrisation (Continued)

element memorized in a database; and/or (iii) the height of the implant by the height of the cicatrisation element, for example based on a color or an indicator of the emergent surface or association with a cicatrisation element memorized in a database.

20 Claims, 11 Drawing Sheets

(58) Field of Classification Search
USPC .................................. 433/173–174, 201.1
See application file for complete search history.

(56) References Cited

U.S. PATENT DOCUMENTS

| | | | |
|---|---|---|---|
| 5,431,567 | A | 7/1995 | Daftary |
| 5,492,471 | A | 2/1996 | Singer |
| 5,527,182 | A | 6/1996 | Willoughby |
| 5,759,036 | A | 6/1998 | Hinds |
| 5,810,592 | A | 9/1998 | Daftary |
| 5,873,722 | A | 2/1999 | Lazzara et al. |
| 5,904,483 | A | 5/1999 | Wade |
| 6,120,292 | A | 9/2000 | Buser et al. |
| 6,155,828 | A | 12/2000 | Lazzara et al. |
| 6,558,162 | B1 | 5/2003 | Porter et al. |
| 8,382,477 | B2 | 2/2013 | Philibin |
| 8,739,444 | B2 | 6/2014 | Poole |
| 2002/0039717 | A1* | 4/2002 | Amber ............... A61B 1/24 433/172 |
| 2006/0019219 | A1 | 1/2006 | Saliger et al. |
| 2007/0092854 | A1 | 4/2007 | Powell et al. |
| 2008/0176188 | A1 | 7/2008 | Holzner et al. |
| 2008/0254412 | A1 | 10/2008 | Korrodi |
| 2009/0239197 | A1 | 9/2009 | Brajnovic |
| 2010/0055645 | A1 | 3/2010 | Mullaly et al. |
| 2010/0303316 | A1 | 12/2010 | Bullis et al. |
| 2012/0035889 | A1 | 2/2012 | Lawitschka et al. |
| 2012/0264081 | A1 | 10/2012 | Philibin |
| 2012/0295223 | A1 | 11/2012 | Robb et al. |
| 2013/0196290 | A1* | 8/2013 | Herrington .......... A61C 8/0068 433/173 |
| 2014/0205969 | A1 | 7/2014 | Marlin |
| 2014/0302458 | A1 | 10/2014 | Towse et al. |
| 2014/0302460 | A1 | 10/2014 | Von Clausbruch |
| 2015/0004563 | A1 | 1/2015 | Blaisdell et al. |
| 2015/0025855 | A1 | 1/2015 | Fisker et al. |
| 2015/0173870 | A1 | 6/2015 | Suttin |
| 2016/0206408 | A1 | 7/2016 | Spindler et al. |
| 2017/0319299 | A1 | 11/2017 | Stemmer et al. |
| 2018/0325631 | A1 | 11/2018 | Christiansen et al. |
| 2020/0008907 | A1 | 1/2020 | Calvat et al. |

FOREIGN PATENT DOCUMENTS

| | | |
|---|---|---|
| CN | 104254298 A | 12/2014 |
| EP | 0442855 A1 | 8/1991 |
| EP | 1229853 A1 | 8/2002 |
| FR | 3027792 A1 | 5/2016 |
| KR | 1020090007477 A | 1/2009 |
| KR | 1020120027025 A | 3/2012 |
| KR | 20140010745 A | 1/2014 |
| KR | 10-1419519 B1 | 8/2014 |
| KR | 101446072 B1 | 10/2014 |
| KR | 101472570 B2 | 12/2014 |
| KR | 20140145014 A | 12/2014 |
| WO | 9717907 A1 | 5/1997 |
| WO | 9327816 A1 | 8/1997 |
| WO | 01/34057 A1 | 5/2001 |
| WO | 2007050436 A2 | 5/2007 |
| WO | 2007129955 A1 | 11/2007 |
| WO | 2010138175 A1 | 12/2010 |
| WO | 2014/012973 A2 | 1/2014 |
| WO | 2014081843 A1 | 5/2014 |
| WO | 2014200404 A1 | 12/2014 |
| WO | 2016/066516 A1 | 5/2016 |

OTHER PUBLICATIONS

EP Communication of third party observations dated Oct. 22, 2020 in application No. EP 15784060.4, counterpart of parent U.S. Appl. No. 15/522,891 and this application; with English machine translation (total 18 pages) (note: D1, US2013196290, D3, U.S. Pat. No. 5,759,036, D4, U.S. Pat. No. 5,492,471, and D5, U.S. Pat. No. 5,810,592 cited in the third party observations are not listed on this IDS form since they are already listed on another IDS form filed concurrently).

EP Notification of intention to grant dated Oct. 22, 2020 in application No. EP 15784060.4, counterpart of parent U.S. Appl. No. 15/522,891 and this application; with English machine translation (total 19 pages).

Brazilian office action dated Apr. 27, 2022 in application No. BR 20191119594, counterpart of co-pending U.S. Appl. No. 16/493,398; English translation (total 8 pages) (note: the documents cited in the Brazilian office action are not listed in this IDS since they are already of record in this application).

Korean Office Action dated Sep. 26, 2022 in application No. KR 1020197028824, counterpart of co-pending U.S. Appl. No. 16/493,398; with English machine translation (total 22 pages) (note: WO2016066516, D1 cited in the Korean Office Action is not listed in this IDS since it is already of record).

EP Notification of intention to grant dated Nov. 18, 2020 in application No. EP 15784060.4, counterpart of parent U.S. Appl. No. 15/522,891 and this application; with English machine translation (total 19 pages) (note: this listing is to correct the erroneous date of Oct. 22, 2020 indicated in the IDS form filed Jul. 8, 2022 for this EP Notification of intention of grant).

Chinese Office Action and Search Report dated Dec. 31, 2020 in application No. CN 201880028370.2, counterpart of co-pending U.S. Appl. No. 16/493,398; with English machine translation (total 13 pages) (Note: the other documents cited in the Chinese Office Action and Search Report are not listed in this IDS form since they are already listed in another IDS form filed concurrently).

Office Action dated Sep. 29, 2023 in co-pending U.S. Appl. No. 16/493,398; with PTO892, without returned SB08 (total 35 pages) (note: U.S. Pat. No. 5,431,567, ref.A, US20020039717, ref.B, KR20140145014 and espacenet translation, ref.N&U, are not listed in this IDS since they were already listed in the IDSs filed Mar. 21, 2023 and Jul. 8, 2022, respectively).

EP Office Action dated Oct. 12, 2020 in application No. EP18709643.3, counterpart of co-pending U.S. Appl. No. 16/493,398; with English machine translation (total 17 pages).

Korean Written Decision on Registration dated Aug. 29, 2023 in counterpart application KR 10-2017-7014561; with English machine translation (total 6 pages) (note: D1, KR101419519, D2, US20130196290, and D4, WO2014012973 cited in the Korean Written Decision on Registration are not listed in this IDS since they are already of record in this application).

EP Communication of Third Party Observations dated Apr. 6, 2021 in application No. EP18709643.3, counterpart of co-pending U.S. Appl. No. 16/493,398; with English machine translation (total 12 pages) (Note: the other documents cited in the EP Communication are not listed in this IDS since they are listed in another IDS form filed concurrently).

EP Office Action dated May 26, 2021 in application No. U.S. Appl. No. 16/493,398, counterpart of co-pending U.S. Appl. No. 16/493,398; with English machine translation (total 8 pages).

Office Action dated Mar. 15, 2023 in co-pending U.S. Appl. No. 16/493,398; with PTO892, without returned SB08 (total 23 pages) (note: KR20140145014, Ref.N cited in the Office Action, is not listed in this IDS since it was already listed in the IDS filed Jul. 8, 2022).

EP Communication of third party observations dated Apr. 1, 2022 in counterpart application No. EP 21167482.5; with English machine translation (total 14 pages) (Note: the other documents cited in the

(56) References Cited

OTHER PUBLICATIONS third party observations are not listed in this IDS since they are already listed in other IDS forms filed concurrently).

EP Office Action dated Jun. 13, 2022 in counterpart application No. EP 21167482.5; with English machine translation (total 18 pages) (Note: the documents cited in the EP Office Action are not listed in this IDS since they are already listed in other IDS forms filed concurrently).

Office Action dated Jun. 10, 2022 in co-pending U.S. Appl. No. 16/493,398; with PTO892, without returned SB08 (total 16 pages).

Australian Office Action dated Dec. 14, 2023 in application AU 2018239402, counterpart of co-pending U.S. Appl. No. 16/493,398 (total 5 pages) (note: D1, WO2016066516, D2, US20150004563, and D3, U.S. Pat. No. 5,759,036 listed in the AU Office Action are not listed in this IDS since they are already of record in this application).

Korean Office Action dated Feb. 13, 2024 in application KR 10-2019-7028824, counterpart of co-pending U.S. Appl. No. 16/493,398 (with English machine translation; total 4 pages) (note: D1, D2, D4 and D5 listed on p. 1 of the KR Office Action are not listed in this IDS since they are already of record in this application).

International Search Report and Written Opinion dated Apr. 19, 2018 in international application No. PCT/EP2018/056509 corresponding to co-pending U.S. Appl. No. 16/493,398; w/ English partial translation and partial machine translation (27 pages) (Note: WO97/27816, D2, and WO2014012973, D3 cited in the ISR are not listed in this IDS form since they are already listed in another IDS form).

Office Action dated May 6, 2024 in co-pending U.S. Appl. No. 16/493,398; with PTO892, without returned SB08 (total 1 40 pages).

\* cited by examiner

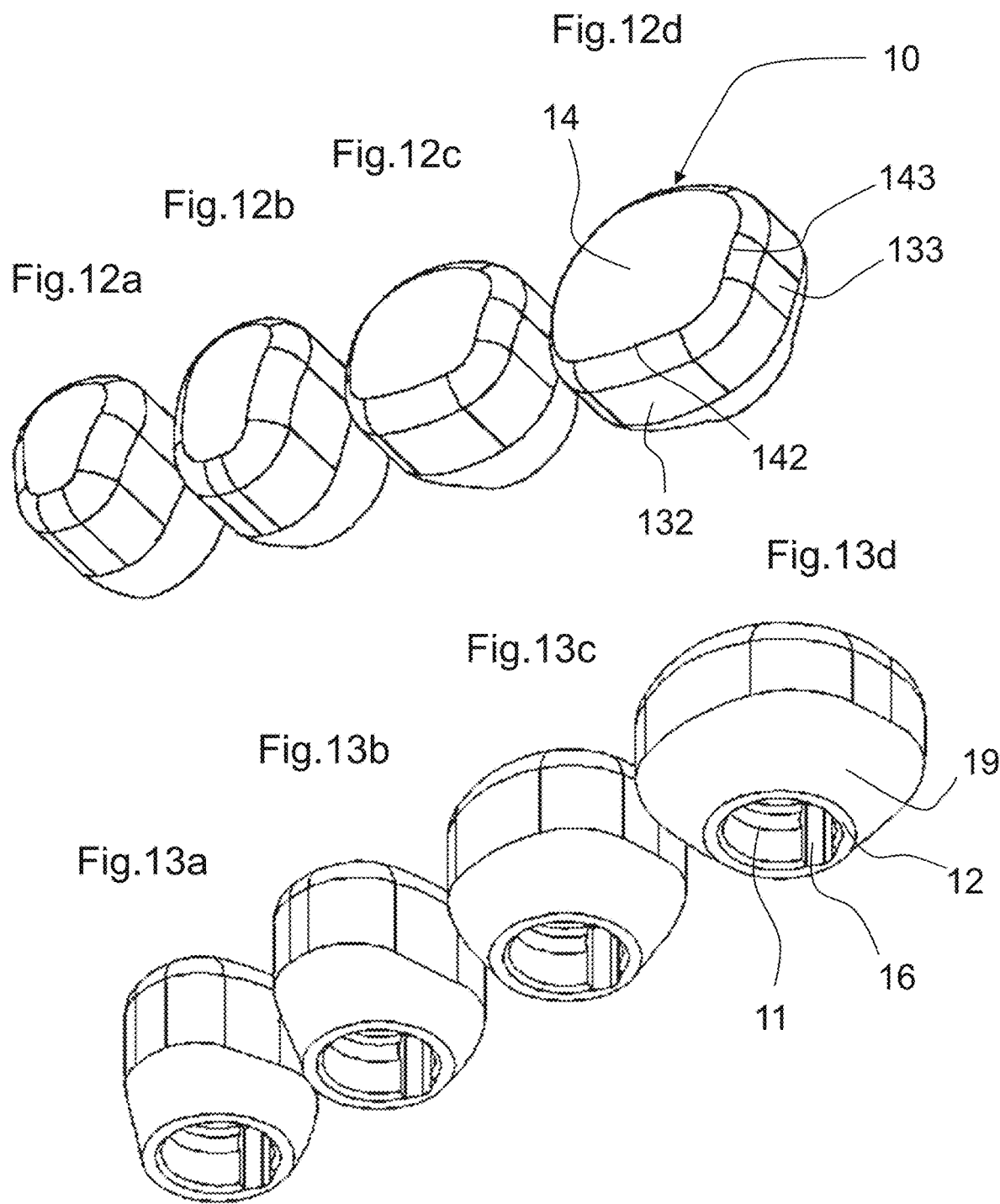

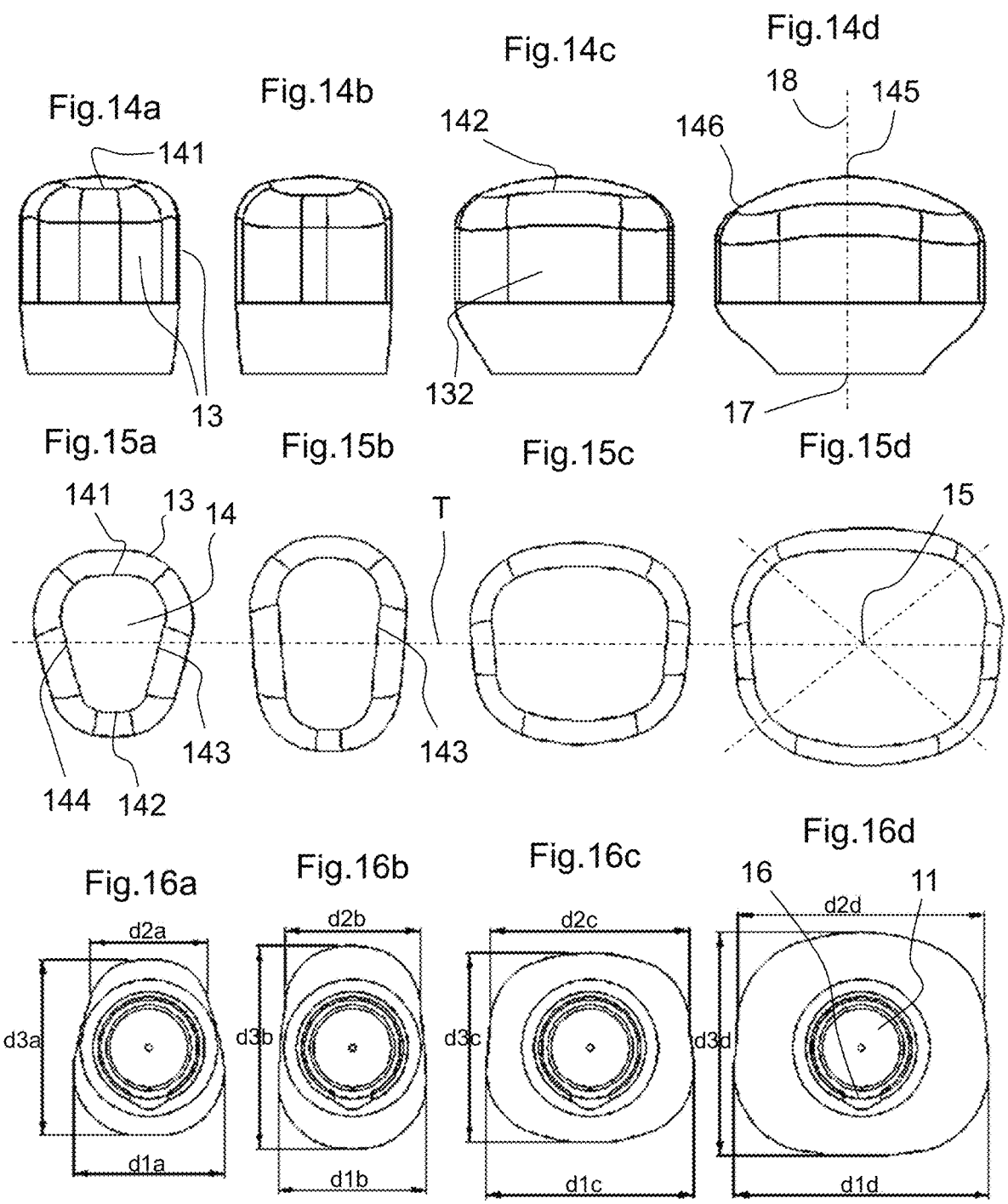

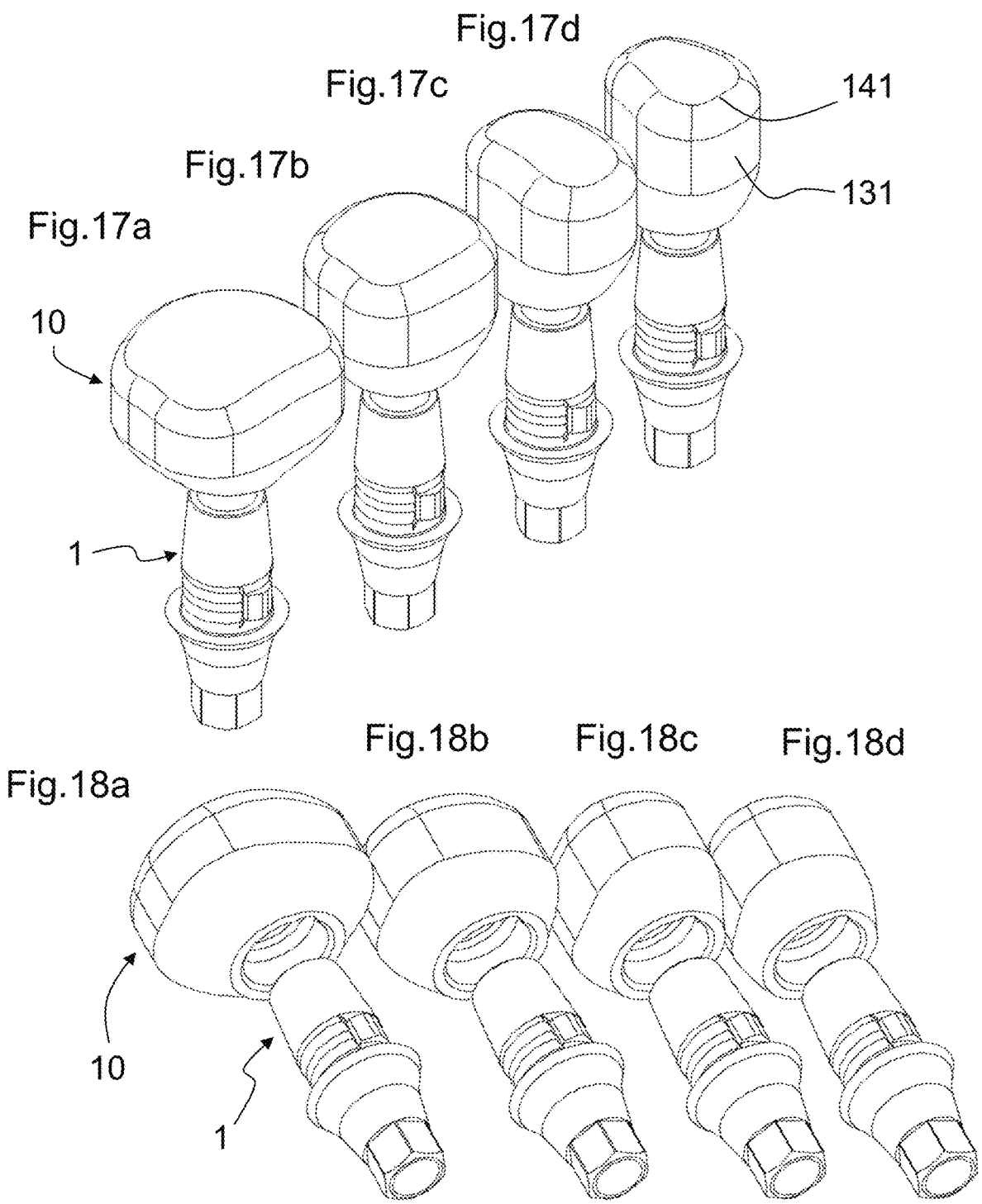

METHOD OF IDENTIFICATION OF POSITIONING OF AN IMPLANT FOR DENTAL RESTORATION

This application is a divisional of U.S. application Ser. No. 15/522,891, U.S. national stage of PCT/EP2015/074476 filed Oct. 22, 2015, the content of each of which is hereby incorporated by reference herein in its entirety.

The present invention relates to a healing set comprising a cicatrisation element for a dental restoration and to a method of fabricating a dental restoration post based on such a cicatrisation element.

Dental restoration makes it possible to produce an artificial denture in a patient having lost some or all of their teeth. It is based on the integration of one or more implants in the bone structure, performed by an incision of the gum in order to reach and penetrate the bone structure. After this, a cicatrisation element is generally secured to an implant and this set remains intact until such time as the implant is incorporated in the bone structure by osteointegration and cicatrisation of the gum around the cicatrisation element. The dental restoration may be completed by the fixation of a restoration post to the implant, on which the denture is secured. The post and the denture are personalized, adapted to the anatomy of the patient and to the tooth being replaced, in order to accomplish a result as close as possible to the ideal natural dentition. For this, the precise volume of the space being restored is generally taken into account, by taking an impression, which allows the personalized fabrication of the denture.

In the prior art, the existing methods of dental restoration are faced with some or all of the following technical problems:

in many existing methods, a new intervention on the gum is performed after its cicatrisation following the implant rest period, to take the impression, physical or digital, of the space being restored, taking into consideration the implant and the gum in order to allow precisely for this overall geometry, in order to fabricate a post and a denture of precise shape: this method is of course traumatizing;

other existing methods limit this traumatization by using cicatrisation components which are not removed when taking the impression, so as not to affect the gum: on the other hand, these methods make use of particular cicatrizing elements, generally of substantially cylindrical standard shape and occasionally integrating indicators and/or several supplemental components to allow a consideration of some or all of the geometry above the implant without having total access to it by the taking of an impression. These less traumatizing methods thus have other drawbacks, of complexity and/or less optimization of the cicatrisation phase.

Thus, a general objective of the invention is a dental restoration solution without some or all of the drawbacks of the prior art.

More precisely, a first objective of the invention is a dental restoration solution which minimizes the traumatization of the patient during the restoration process.

A second objective of the invention is a dental restoration solution which allows a restoration adapted as much as possible to the anatomy of the patient.

A third objective of the invention is a dental restoration solution which is as universal as possible, adapted to all implants and all restorations.

A fourth objective of the invention is a dental restoration solution which is as simple as possible.

For this purpose, the invention is based on a healing set capable of a connection to a dental implant during a cicatrisation phase of a dental restoration process, comprising a cicatrisation element designed to be surrounded at least partially by a gum and a post base designed to be fixed in an implant, characterized in that the cicatrisation element has a lateral surface designed to be integrated inside a gum in order to structurize the gum during its cicatrisation, and a terminal surface, one portion of the lateral surface and of the terminal surface forming an emergent surface, designed to remain outside the gum, which is asymmetrical with respect to at least a median perpendicular plane, and in that the post base has a longitudinal axis for its entire length, able to be aligned with the axis of an implant.

The cicatrisation element may be capable of a connection with a dental implant, and it may have a lateral surface designed to be integrated inside a gum in order to structurize the gum during its cicatrisation, and a terminal surface, characterized in that one portion of the lateral surface and of the terminal surface form an emergent surface, designed to remain outside the gum, which is asymmetrical with respect to at least a median perpendicular plane.

The parts of the emergent surface designed respectively for a positioning oriented to the inside and to the outside of the mouth may have a different shape.

A cross section of its lateral surface or a projection onto a parallel plane of the emergent surface may have:

a substantially trapezoidal shape or a substantially polygonal, or triangular, or square, or rectangular, or ovoid shape, or a substantially polygonal shape with rounded corners; and/or a portion designed for a positioning oriented toward the outside of the mouth with larger dimension than a portion designed for a positioning oriented toward the inside.

Its terminal surface and/or its emergent surface may have:
a nonplanar, curved surface; and/or
a convex surface; and/or
a surface with no roughness; and/or
a surface with no through opening.

The cicatrisation element may be a cap which comprises an opening in a surface opposite the terminal surface to cooperate with a post base.

The cicatrisation element may comprise an anti-rotation element, especially a groove, for its fixation to a post base with no rotation about the post base.

Its terminal surface or its emergent surface may comprise an indicator to indicate its height or the cicatrisation element may have a colour to indicate its height.

The cicatrisation element can be a cicatrisation post comprising a device for connection to an implant.

The invention also relates to a set formed by the removable combination of a post base and a cap, characterized in that the cap is a cicatrisation element as described previously.

The post base may comprise a device for connection to an implant, and the terminal surface or the emergent surface of the cap may comprise one side parallel to a planar surface of the connection device.

The invention also relates to a series of cicatrisation elements, characterized in that it comprises at least two cicatrisation elements as previously described, having different shapes, or in that it comprises at least three cicatrisation elements of different shapes.

The invention also relates to a method of fabrication of a dental restoration post, designed to be secured to a dental implant at a first end and to receive a denture at its second end, characterized in that it involves the following steps:

taking of a manual or digital impression of the buccal space, comprising a cicatrisation element as previously described which is secured to the implant;

automatic detection of the positioning of the implant by the identification of:

the axis of the implant corresponding to an axis of the cicatrisation element identified by the geometry of its emergent surface outside the gum or based on an association with a cicatrisation element memorized and stored in a database, especially based on its reference entered through a man/machine interface or its automatic recognition by the shape of its emergent portion;

the orientation of the implant based on the orientation of the emergent surface outside of the gum or based on an association with a cicatrisation element memorized in a database, especially based on its reference entered through a man/machine interface or its automatic recognition by the shape of its emergent portion;

the height of the implant by determination of the height of the cicatrisation element, based on a colour or an indicator of its emergent surface outside of the gum or based on an association with a cicatrisation element memorized in a database, especially based on its reference entered through a man/machine interface or its automatic recognition by the shape of its emergent portion.

The invention is defined more precisely by the claims.

These objectives, characteristics and advantages of the present invention will be explained in detail in the following description of a particular embodiment given in nonlimiting manner in regard to the enclosed figures, of which:

FIG. 12a shows a perspective top view of a first cap in a series of caps according to the embodiment of the invention.

FIG. 12b shows a perspective top view of a second cap in the series of caps according to the embodiment of the invention.

FIG. 12c shows a perspective top view of a third cap in the series of caps according to the embodiment of the invention.

FIG. 12d shows a perspective top view of a fourth cap in the series of caps according to the embodiment of the invention.

FIG. 13a shows a perspective bottom view of the first cap shown in FIG. 12a.

FIG. 13b shows a perspective bottom view of the second cap shown in FIG. 12b.

FIG. 13c shows a perspective bottom view of the third cap shown in FIG. 12c.

FIG. 13d shows a perspective bottom view of the fourth cap shown in FIG. 12d.

FIG. 14a shows a side view of the first cap shown in FIG. 12a.

FIG. 14b shows a side view of the second cap shown in FIG. 12b.

FIG. 14c shows a side view of the third cap shown in FIG. 12c.

FIG. 14d shows a side view of the fourth cap shown in FIG. 12d.

FIG. 15a shows a top view of the first cap shown in FIG. 12a.

FIG. 15b shows a top view of the second cap shown in FIG. 12b.

FIG. 15c shows a top view of the third cap shown in FIG. 12c.

FIG. 15d shows a top view of the fourth cap shown in FIG. 12d.

FIG. 16a shows a bottom view of the first cap shown in FIG. 12a.

FIG. 16b shows a bottom view of the second cap shown in FIG. 12b.

FIG. 16c shows a bottom view of the third cap shown in FIG. 12c.

FIG. 16d shows a bottom view of the fourth cap shown in FIG. 12d.

FIG. 17a shows a perspective top view of an intermediate phase of association of the first cap shown in FIG. 12a with a post base in a restoration method according to the embodiment of the invention.

FIG. 17b shows a perspective top view of an intermediate phase of association of the second cap shown in FIG. 12b with a post base in the restoration method according to the embodiment of the invention.

FIG. 17c shows a perspective top view of an intermediate phase of association of the third cap shown in FIG. 12c with a post base in the restoration method according to the embodiment of the invention.

FIG. 17d shows a perspective top view of an intermediate phase of association of the fourth cap shown in FIG. 12d with a post base in the restoration method according to the embodiment of the invention.

FIG. 18a shows a perspective bottom view of the intermediate phase of association of the first cap shown in FIG. 12a with the post base shown in FIG. 17a in the restoration method according to the embodiment of the invention.

FIG. 18b shows a perspective bottom view of the intermediate phase of association of the second cap shown in FIG. 12b with the post base shown in FIG. 17b in the restoration method according to the embodiment of the invention.

FIG. 18c shows a perspective bottom view of the intermediate phase of association of the third cap shown in FIG. 12c with the post base shown in FIG. 17c in the restoration method according to the embodiment of the invention.

FIG. 18d shows a perspective bottom view of the intermediate phase of association of the fourth cap shown in FIG. 12d with the post base shown in FIG. 17d in the restoration method according to the embodiment of the invention.

Figure 1:
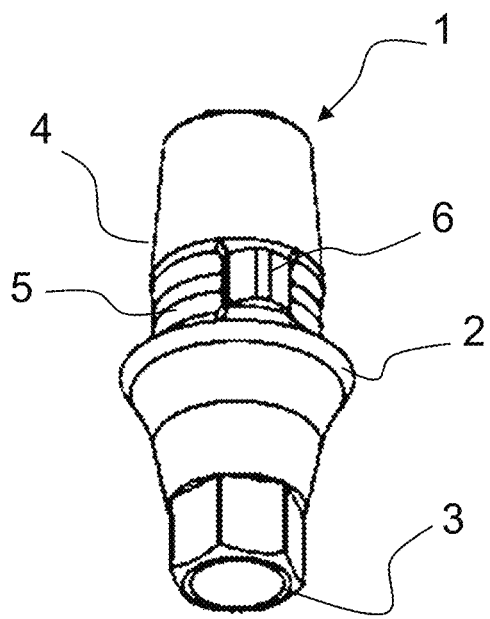
FIG. 1 shows a first perspective view of a post base used in a restoration method according to one embodiment of the invention.
Figure 2:
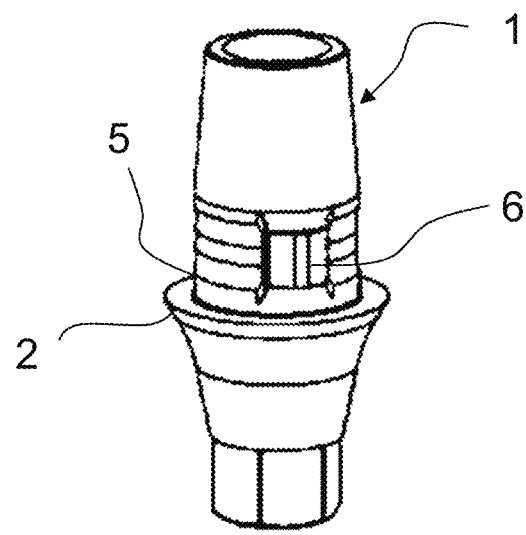
FIG. 2 shows a second perspective view of the post base used in the restoration method according to the embodiment of the invention.
Figure 3:
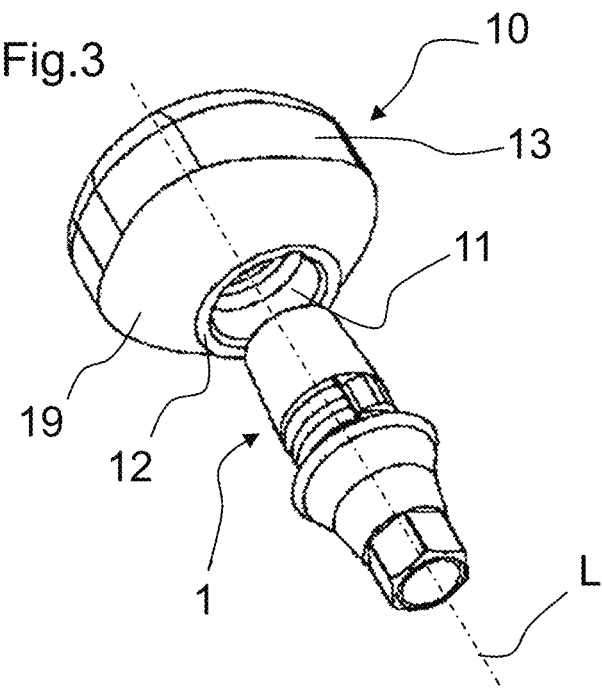
FIG. 3 shows a perspective view of an intermediate phase of association of a cap on a post base in a restoration method according to the embodiment of the invention.
Figure 4:
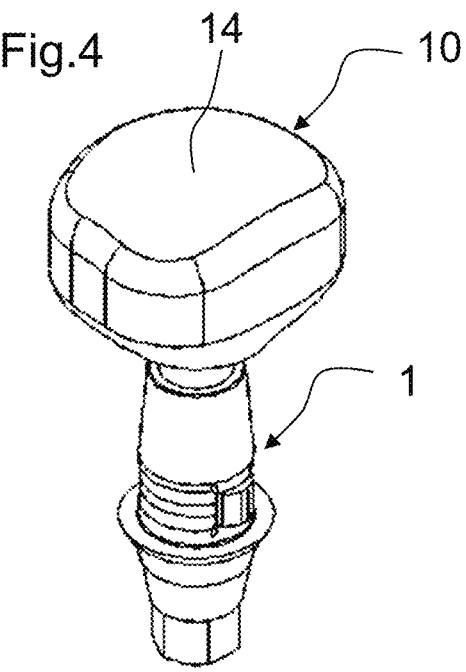
FIG. 4 shows another perspective view of the intermediate phase of association of the cap on the post base in the restoration method according to the embodiment of the invention.
Figure 5:
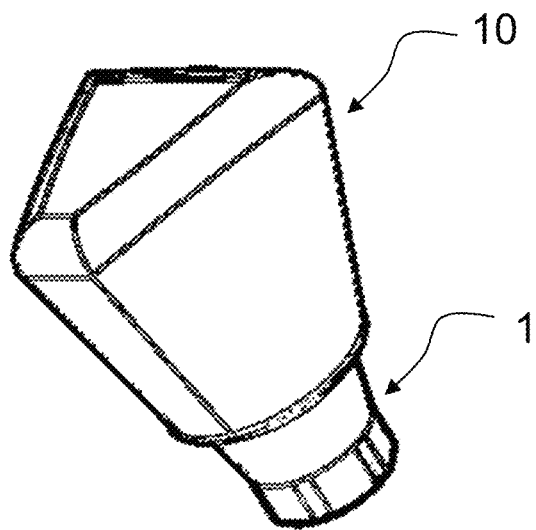
FIG. 5 shows a perspective view of the set obtained after fixation of a cap to a post base in a restoration method according to the embodiment of the invention.
Figure 6:
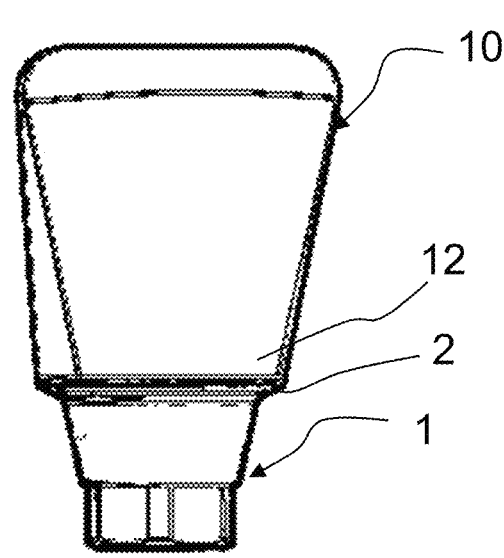
FIG. 6 shows another perspective view of the set obtained after fixation of the cap to the post base in the restoration method according to the embodiment of the invention.
Figure 7:
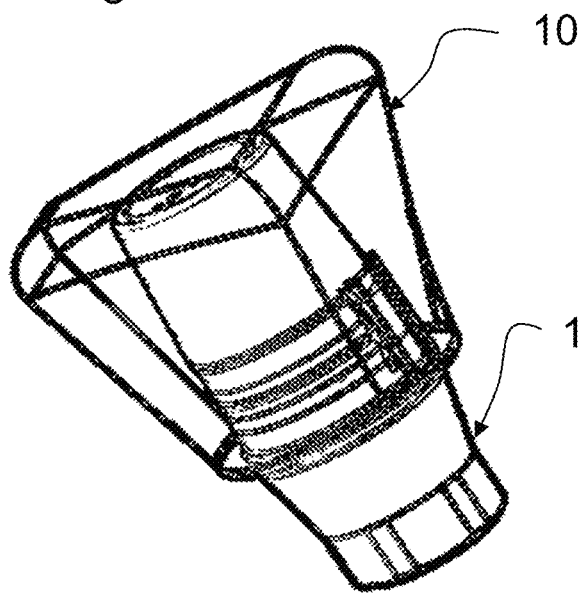
FIG. 7 shows a similar perspective view as FIG. 5, with the cap shown as being transparent in order to reveal the post base.
Figure 8:
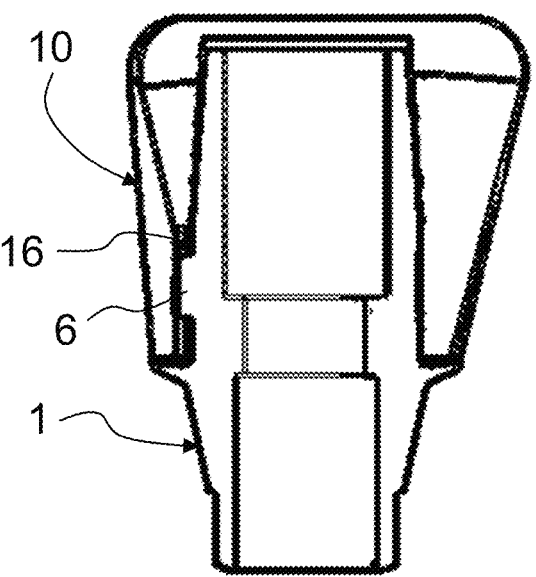
FIG. 8 shows a similar perspective view as FIG. 6, with the cap shown as being transparent in order to reveal the post base.

The restoration method according to the embodiment of the invention thus involves two phases, as explained above: a first so-called cicatrisation phase during which one or more implant(s) are integrated in the bone structure of the patient by osteointegration, and during which a particular cicatrisation cap associated with a post base are used, as shall be explained below, then a second restoration phase proper, during which a definitive denture is put in place on the one or more implants by means of a restoration post.

According to the embodiment of the invention which is going to be described, a dental restoration in the first phase of cicatrisation makes use of an intermediary component which we shall call the post base 1, sometimes simply called a post or T-base or Esthétibase. The post base 1, shown in particular in FIGS. 1 to 8, comprises two main parts, separated by a collar 2. A first part comprises a connection device 3 to an implant. A second crown part is designed to receive a cicatrisation cap 10. For this, it comprises a connection device 4 to said cap. According to the embodiment, this connection device 4 comprises a clipping element 5 and an anti-rotation element 6, to prevent the cap from turning about the longitudinal axis L of the post base 1, this longitudinal axis L being furthermore designed to be aligned with the axis of an implant. According to the embodiment, the anti-rotation element 6 is a tab. This anti-rotation element 6 is moreover aligned with a particular surface of the connection device 3 to an implant. Moreover, according to the embodiment, the clipping element 5 is formed by several grooves arranged on the circumference of the post base 1 in the vicinity of the collar 2. Advantageously, the clipping element 5 is such as to allow an audible click when secured by clipping of a cicatrisation cap 10.

It should be noted that the post base 1 used is not definitive, it participates only in the first phase of cicatrisation, and is preferably removed during the completion of the restoration and replaced by a definitive restoration post (which may be in the form of another base). As a variant, the same post base 1 may optionally be removed, cleaned, and reused in the definitive restoration, then performing the second function of a restoration post.

Moreover, the post base 1 is preferably universal, and it has a symmetrical or, more precisely, quasi-symmetrical shape (the anti-rotation element for example is an exception to the symmetry) about a longitudinal axis L which forms an axis of revolution. Thus, this axis L forms in particular a central axis of symmetry of the connection device 3 to an implant. Advantageously, this same axis L also forms an axis of symmetry of the connection device 4 to a cap. The post base 1 thus extends overall in a single direction, identified by a single longitudinal axis L. We may thus more generally consider that the post base has a longitudinal axis L which extends for its entire length, so as to be aligned with the axis of an implant 60. In particular, the two connection devices 3, 4 of the post base 1 are arranged at different levels around this same longitudinal axis L.

Figure 23:
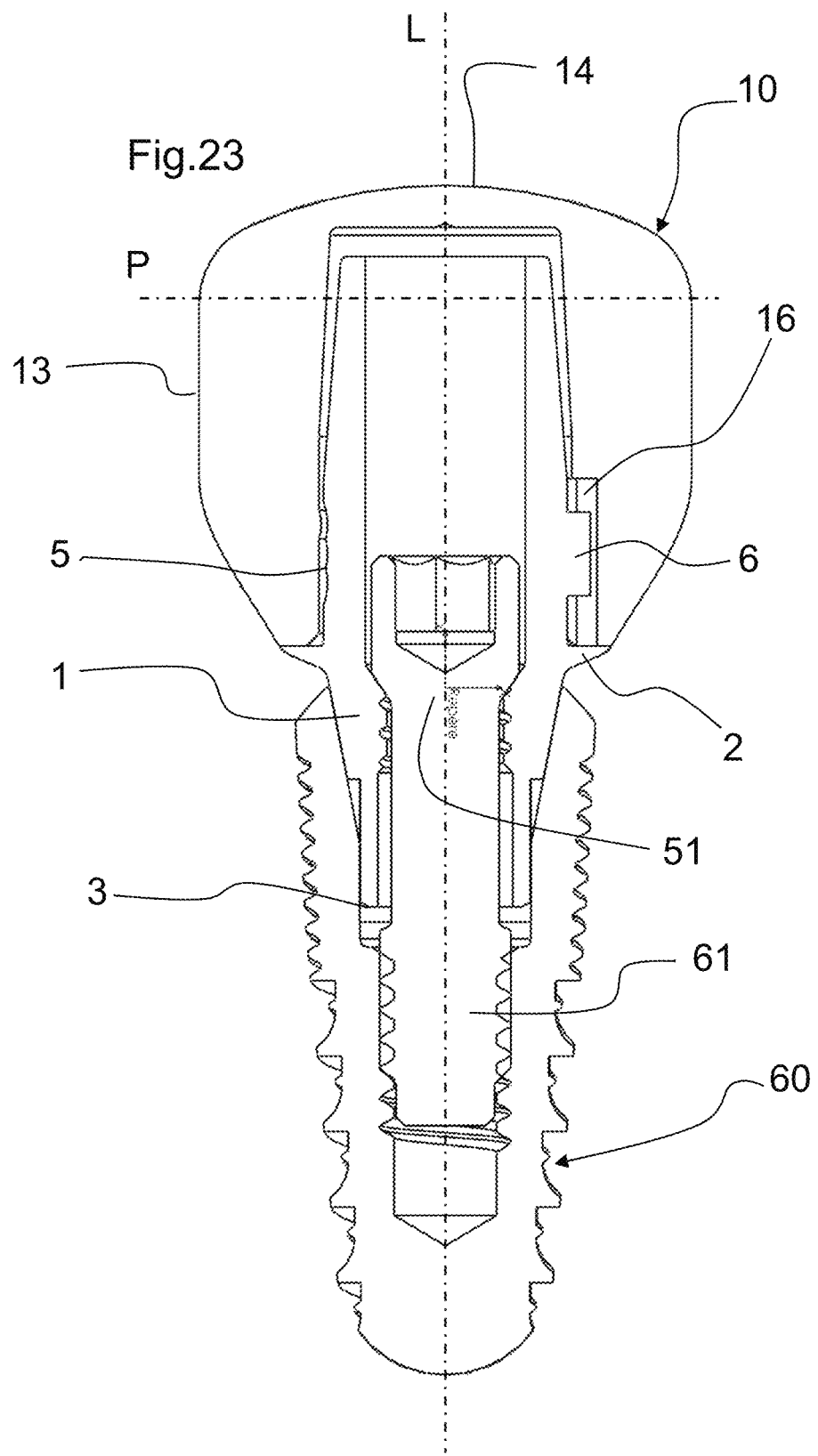
FIG. 23 illustrates a sectional view of a cap according to the embodiment of the invention arranged on a post base fixed in an implant.
Figure 24:
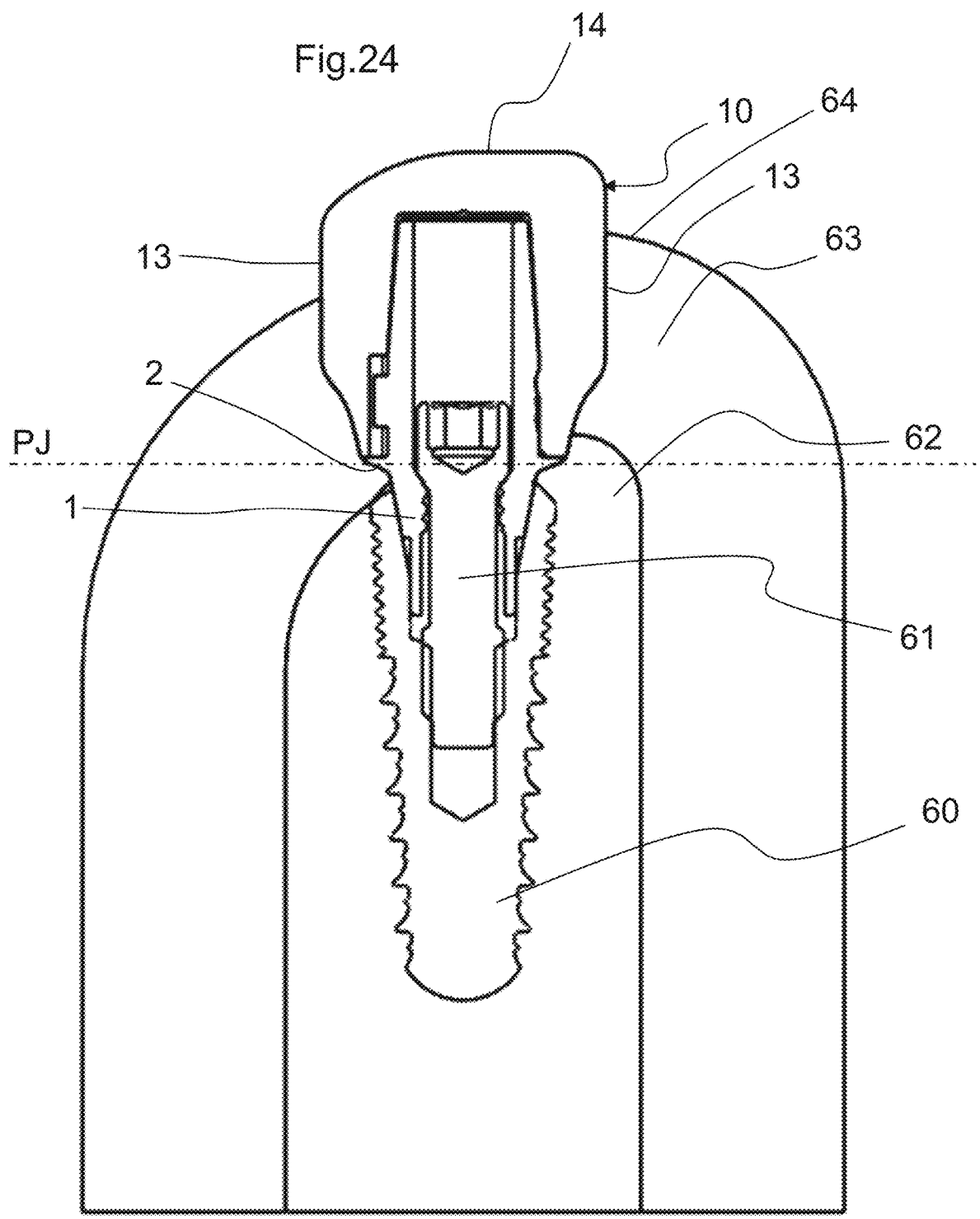
FIG. 24 illustrates a sectional view of a healing set comprising a cap surrounded by the gum and arranged on a post base fixed in an implant according to the embodiment of the invention.

After the fixation of an implant 60 during a dental restoration method, a post base 1 is secured to the implant 60 by its connection device 3, and by means of a screw 61, and then a cap 10 is secured to the second crown portion of the post base. This assembly is illustrated by FIGS. 23 and 24. As illustrated especially by FIGS. 3 and 7, the cap 10 has an opening 11 to form a connection portion and a hollow interior volume, designed for the insertion of the second crown portion of the post base. The contour of this opening 11 has a surface 12 designed to bear against a corresponding planar surface of the collar 2 of the post base, after clipping of the cap 10 to the post base, in order to obtain the assembled set shown by FIGS. 5 to 8 and 19a to 19d.

There are as many different post bases as there are different connection devices for existing implants, in order to have for each existing implant a post base having a connection device 3 adapted to it. The advantage of this approach is that it allows one to keep the entire second crown portion of the post bases, starting with the collar 2, unchanged, regardless of the implant corresponding to the post base. Of course, it is also possible to provide different second crown portions for different post bases, depending on their contemplated use. In any case, the second crown portion of the post base is independent of the implant, and not correlated with the fixation device of the implant.

The function of the cap 10 is to be lodged inside the incised gum, after fixation of an implant, by preferably removable fixation to a post base connected to the implant. The final configuration is shown in FIG. 24. In this configuration, the implant 60 is joined to the bony portion 62, the post base 1 is secured to the implant 60, such that its collar 2 is positioned in the area of the border between the bony portion 62 and the gum 63. The cap 10 covers the post base 1 as far as the collar 2, so that the gum 63 is almost exclusively in contact with the cap 10. The set formed by the assembly of a cap on a post base thus corresponds to a healing set, which is temporarily involved in the restoration process, allowing the cicatrisation and nontraumatic fabrication of the definitive denture, as will be explained below.

Figure 25:
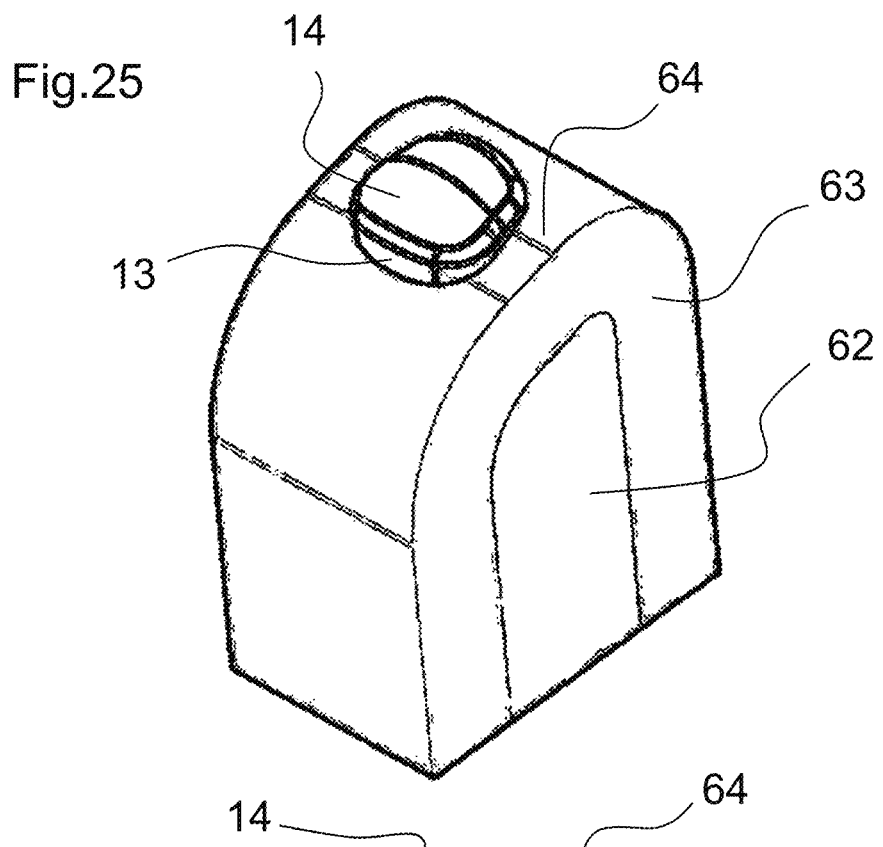
FIG. 25 shows a schematic perspective view of a gum in cross section, within which is secured a healing set according to the embodiment of the invention.
Figure 26:
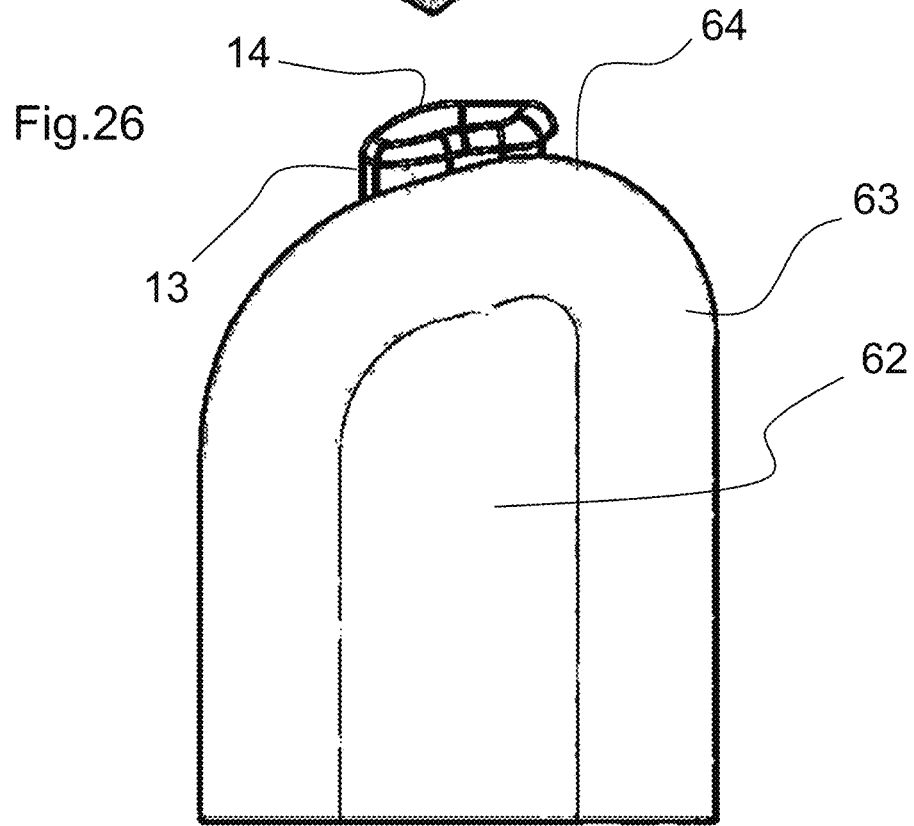
FIG. 26 shows a schematic side view of a gum in cross section, within which is secured a healing set according to the embodiment of the invention.

The gum 63 thus heals around the lateral surface 13 of the cap 10. For this, this lateral surface 13 is chosen to best correspond to the buccal environment of the patient. The terminal surface 14 opposite the opening 11 of the cap is designed to remain visible above the gingival surface 64 of the gum 63, since the gum remains entirely in contact with the lateral surface 13 of the cap. It should be noted that the top portion of the lateral surface 13 and the terminal surface 14 thus form an emergent surface of the cap. This emergent surface is illustrated in particular by FIGS. 25 and 26. For this, caps of different height can be provided to adapt to different configurations of the buccal geometry. By way of example, three different standard heights allow a good adaptation to every situation. This height is advantageously between 3 and 7 mm. Due to the use of a post base which plays the role of an interface, a same cap 10 is thus universally adapted to all the existing implants.

According to the embodiment of the invention, the shape of the cap is chosen specifically to encourage the cicatrisation of the gum in an anatomical form best corresponding to the tooth being replaced and consequently as well for the future denture which will occupy this buccal space. This shape is characterized in particular by the plane cross section of its lateral surface 13, this section being a section passing through a plane P perpendicular to the lateral surface 13, shown in FIG. 23, and substantially parallel to the terminal surface 14. It will be noted that this section is substantially reproduced by the shape of the terminal surface 14, or more precisely by the projection of this terminal surface 14 onto such a perpendicular plane, that is, substantially parallel to the gingival surface 64.

Figure 9:
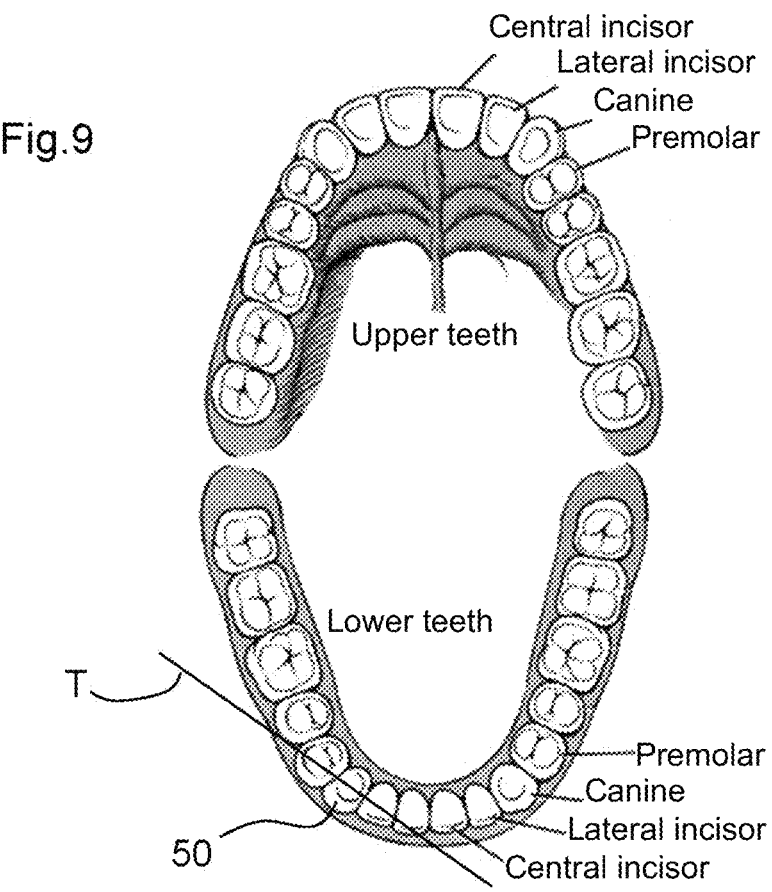
FIG. 9 shows the lower and upper teeth in a top view.
Figure 10:
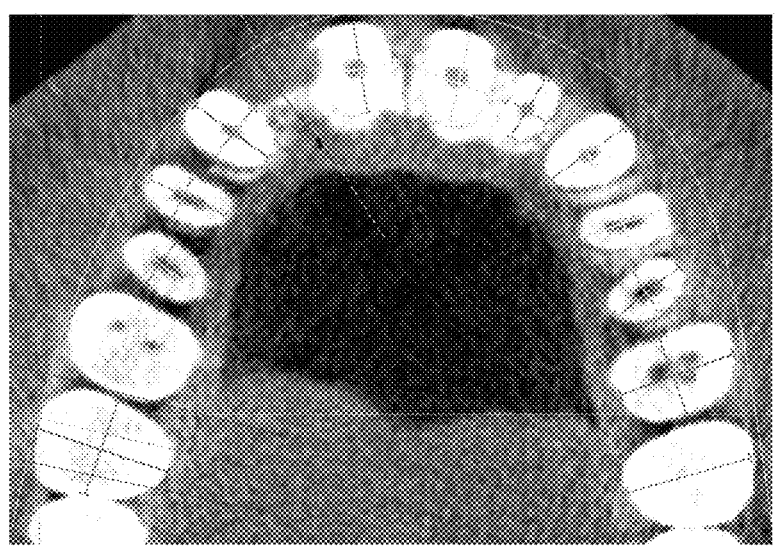
FIG. 10 shows a view of the teeth in a justa-gingival section.

In order to understand the method adopted, FIG. 9 shows a top view of the upper and lower teeth and FIG. 10 shows a sectional view in the area of the justogingival plane PJ of a dentition, represented in FIG. 24, at the level of the base of the tooth emergences. These figures show that the teeth have cross sections of different shapes, which can be simplified as rectangular and/or square and/or triangular shapes, but more precisely trapezoidal shapes.

Figure 11:
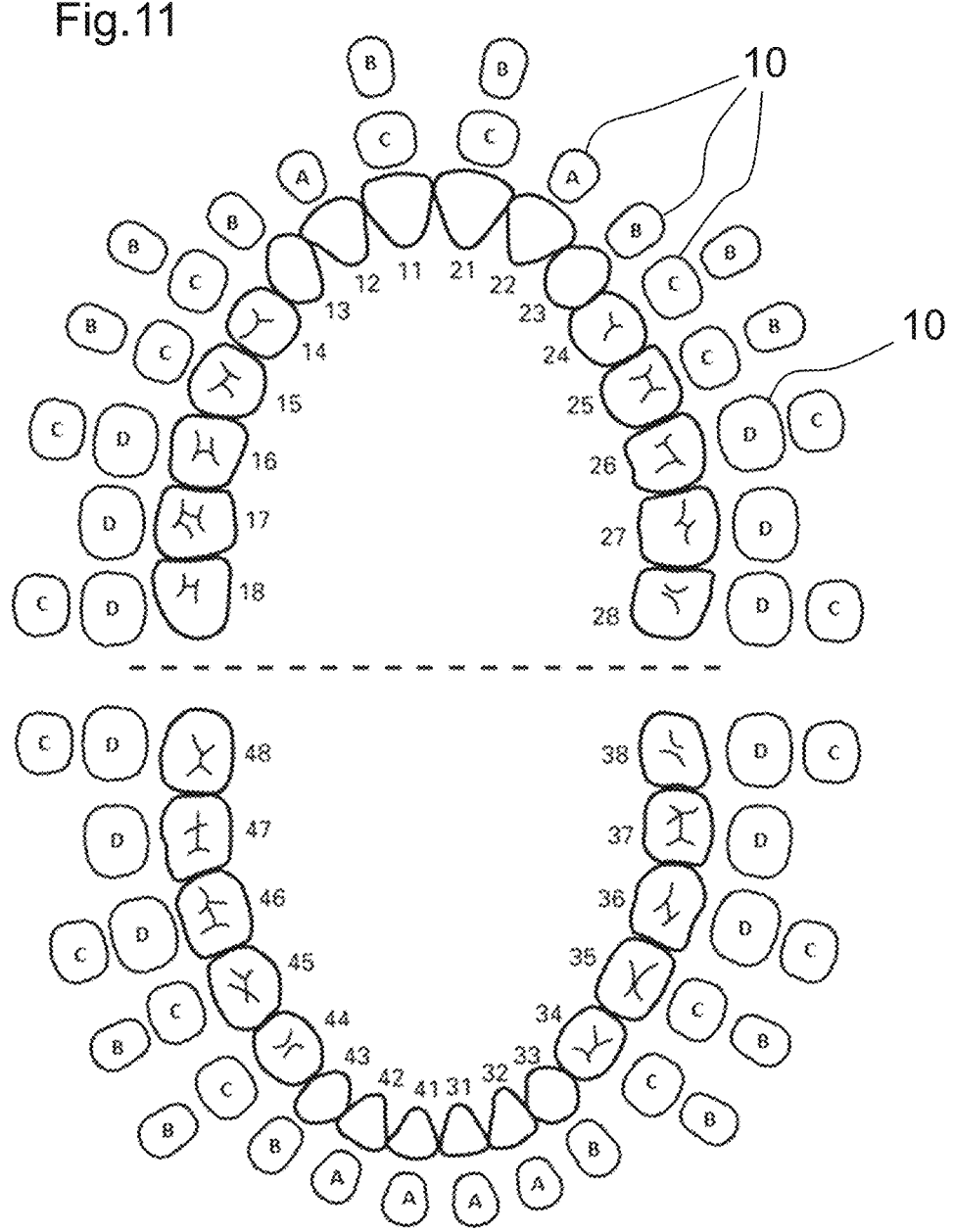
FIG. 11 shows a horizontal section of the dentition at the justa-gingival level, as well as the corresponding caps observed according to the embodiment of the invention.
Figure 19A:
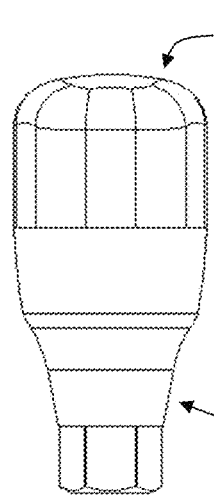
FIG. 19a shows a side view of the first cap shown in FIG. 12a assembled with the post base shown in FIG. 17a according to the embodiment of the invention.
Figure 19B:
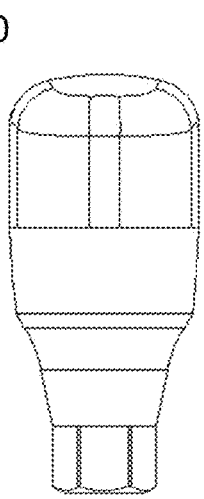
FIG. 19b shows a side view of the second cap shown in FIG. 12b assembled with the post base shown in FIG. 17b according to the embodiment of the invention.
Figure 19C:
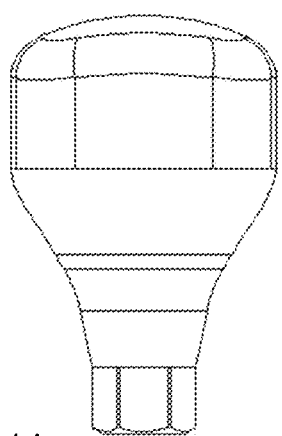
FIG. 19c shows a side view of the third cap shown in FIG. 12c assembled with the post base shown in FIG. 17c according to the embodiment of the invention.
Figure 19D:
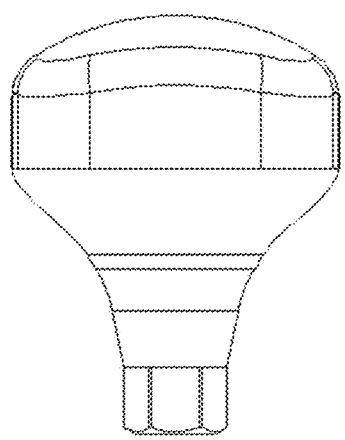
FIG. 19d shows a side view of the fourth cap shown in FIG. 12d assembled with the post base shown in FIG. 17d according to the embodiment of the invention.

According to the embodiment chosen, a series of caps 10 of different shapes will best enable a reproduction of these different shapes. FIG. 11 thus shows a top view of cross sections of all the teeth and a top view of caps 10 associated with each tooth. The shapes of the different series of teeth, numbered from 11 to 18, from 21 to 28, from 31 to 38 and from 41 to 48 in this figure, while these numbers should not be confused with the numerical references used elsewhere in the other figures to designate the characteristics of the invention, are all approximated by the use of four different caps 10, referenced as A to D. For certain teeth, or even all the teeth, several of the caps, among the caps A to D, will appear to be suitable.

In the embodiment chosen and illustrated in FIG. 11, the caps A are adapted to handle the restoration of the upper lateral incisors and all the lower incisors. The caps B are adapted to the restoration of the canines and the premolars, the caps C are adapted for the restoration of the intermediate molars, and the caps D are adapted for the restoration of the largest molars. These caps shall now be described in further detail. Cap A is particularly illustrated by FIGS. 12*a* to 16*a*, cap B by FIGS. 12*b* to 16*b*, cap C by FIGS. 12*c* to 16*c* and cap D by FIGS. 12*d* to 16*d*. So as not to clutter up the figures, the numerical references are not reproduced on all the caps of these figures; however, all these caps have the same characteristics, which shall be described.

As emerges from FIGS. 12 and 15, the terminal surfaces 14 of these caps 10 (A to D), designed for a positioning above the gingival emergence, are substantially planar and designed for a positioning parallel to a horizontal plane (parallel to the justogingival plane PJ, between 1 and 2 mm included above this plane) corresponding to the sectional plane of FIG. 9. However, they are slightly convex, having a central part 145, more particularly visible in FIGS. 14*a* to 14*d*, designed to rise more above the gum than its peripheral portions 146.

The transverse section of the cap, through a plane P perpendicular to its lateral surface 13, as explained above, giving the final shape to the gum after the cicatrisation, is substantially reproduced by the terminal surface 14 of the cap, which is a prolongation thereof. The sections of all the caps all have a substantially trapezoidal shape. They comprise a large side 141, which will be situated on the external side of the mouth (vestibular side), an opposite and parallel small side 142, which will be situated on the inside of the mouth (lingual side), joined by two sides 143, 144. The intersection of the diagonals of the trapezium makes it possible to define a centre 15. Moreover, considering the centre 17 of the substantially circular opening 11 of the opposite surface of the cap 10, it is possible to define a central axis 18 of the cap, passing through the two central points 15, 17. This axis 18 of the cap 10 is perpendicular to the terminal surface 14. The entire architecture of the post base and associated cap 10 is designed so that the axis 18 of the cap corresponds to the longitudinal axis L of the post base, and to the axis of the implant.

The four types of caps 10, A, B, C and D thus differ in particular in the trapezoidal shape of the cross section of their lateral surfaces 13. The trapezium of the smallest cap A approximates a triangle, since its small side 142 is very reduced. The trapezium of the cap B approximates a rectangle whose large side runs from the outside to the inside of the mouth, and corresponds to the sides 143, 144. On the contrary, the trapeziums of the caps C and D approach a rectangle, or even a square, whose large side is in the opposite direction, and corresponds to the sides 141, 142, which have similar but slightly different length. As sample embodiments, FIGS. 16*a* to 16*d* show the orders of magnitude of the dimensions of these caps, in millimetres:

FIG. 16*a*: d1a 4.5 mm, d2a 3.5 mm, d3a 5.2 mm;
FIG. 16*b*: d1b 4.4 mm, d2b 4 mm, d3b 6 mm;
FIG. 16*c*: d1c 6.1 mm, d2c 5.9 mm, d3c 5.6 mm;
FIG. 16*d*: d1d 7.5 mm, d2d 7.3 mm, d3d 6.6 mm.

Of course, this substantially trapezoidal shape adopted has rounded corners and curved sides, in order to guarantee no trauma to the gum. Moreover, the terminal surface 14 of each cap presents a continuous surface, with no relief, and/or with no hollow portion, and/or with no groove, and/or with no ridge, and/or with no roughness. This surface is convex. In particular, it does not have a hollow shape, and of the course no through opening, such as would be necessary if it were chosen to attach the cap by a fixation screw. This geometry with no roughness is favourable to oral hygiene, for example, it prevents the accumulation of food and the deposition of dental plaque.

As a variant, the series of caps could include a different number of different geometries, for example at least three, or at least two. In one simplified variant, a single shape of cap could suit all the teeth.

According to other variant embodiments, the transverse section of a cap in the area of its lateral surface 13 could approximate any polygon, such as a polygon of three, five, or six sides. As a variant, the angles of these polygons could be so rounded that the overall shape would approximate an oblong shape, or even an ovoid cross section, or any other elongated shape of a polygon. Advantageously, this shape comprises at least one centre or perfectly defined geometrical point to define a centre 15, or even an axis 18 of the cap, this centre being advantageously, but not necessarily, in the alignment of the longitudinal axis L of the post base.

According to the embodiment, the geometry of the visible emergent surface of the cap on the inside of the mouth differs from the geometry on the outside, in order to take account of the curvature of the gum. This shape of the emergent surface of the cap is thus asymmetrical with respect to a median plane containing the tangent T to the gum, as represented in FIGS. 15a to 15d, and more precisely in FIG. 9, considering one tooth 50 being restored. This median plane, or tangent plane T, is parallel to the tangent T to the gum, perpendicular to the justogingival plane PJ, and passes down the middle 15 of a cap.

Thus, a circular shape for the cross section of the cap, associated with a cylindrical cap for example, is ill-suited. More generally, any plane curve having a symmetry about a point or an axis is ill suited or not at all suited for the aforementioned cross section of the cap, since on the one hand it would not be adapted to the anatomy of the mouth, and on the other hand its circular orientation about this axis would no longer be identifiable. For the same reasons, the emergent and visible surface of the cap is thus not symmetrical with respect to at least one, or even several planes parallel to its axis 18, and/or including this axis 18. It is not symmetrical with respect to at least one or several planes perpendicular to the emergent surface passing through its centre 15, which we shall call median perpendicular planes. In the example represented, only the plane perpendicular to the mentioned tangent plane T, passing down the middle of the two sides 141, 142, forms a plane of symmetry. The foregoing remarks apply to the emergent surface of the cap, or to its transverse section through a sectional plane P as previously defined, or to the projection of its emergent surface onto such a plane P. The median perpendicular plane is thus any plane perpendicular to the plane P and passing through the centre of the particular geometry of the cap. Alternatively, a median perpendicular plane may be defined as any plane containing the axis 18 of the cap. This emergent surface of a cap, finally, can assume any identifiable three-dimensional shape making it possible to recognize the cap being used and possibly determine its orientation, in order to carry out a second function which shall be described below.

The terminal surfaces 14 of the caps are prolonged, starting from their periphery 146, by the lateral surface 13 about which the gum is cicatrising, and which thus shapes the gum suitably for the future denture. This lateral surface 13 has several surfaces 131, 132, 133, 134, substantially planar, possibly slightly curved, extending in a direction substantially parallel to the axis 18 of the cap and/or parallel to the longitudinal axis L of the post base, respectively prolonging the different sides 141, 142, 143, 144 of the terminal surface 14 of the cap. The interfaces between the terminal surface 14 and these different portions of the lateral surface 13 are realized by rounded surfaces, with no roughness, in particular convex ones.

Finally, the lateral surface 13 of the caps is terminated by a substantially truncated conical surface 19 as far as the substantially circular opening 11, previously mentioned. This opening 11 emerges onto a hollow portion inside the cap 10, allowing for the lodging of the second crown portion of the post base. This hollow portion is provided with a fixation device in addition to that 4 of the post base. In the embodiment, this involves bulges provided to clip onto the grooves 5 of the post base. Finally, a substantially longitudinal groove 16 is arranged in this hollow portion of the cap in order to cooperate with the tab, thus forming a connection which is locked in rotation, and perfectly indexed, the orientation of the cap being unique and perfectly established. FIGS. 3 to 8 and 17a to 17d, 18a to 18d and 19a to 19d show in particular a healing set according to the invention, formed by the assembly of a cap 10 with a post base 1.

The cap can be made of plastic material compatible with medical use, and be pink, white or cream in colour. As a variant, it can be made of metal, such as titanium, or can be made of zirconium.

The use of the cicatrisation caps thus allows an encouraging of an ideal cicatrisation of the gum in a dental restoration process, as has been discussed, on account of its geometry conceived in harmony with the buccal anatomy. The solution has been described with a removable cicatrisation cap, distinct from a base, in the preceding embodiment. Thus, the cap can be present in other forms and shall be called more generally a cicatrisation element 10 hereinafter. It should be noted that this cicatrisation element as a variant may be totally subgingival and invisible, and then be made visible by a procedure on the gum to carry out the rest of the reconnaissance process which is described below. In this case, the end portion of the cap will always be called inappropriately the emergent portion. The cap will thus be called more generally a "cicatrisation element" in the following.

Besides the advantages previously described, the cicatrisation element makes it possible to carry out an advantageous restoration process, involving a method of fabrication of a definitive denture and post, with minimal traumatization of the gum. In fact, it is possible to obtain a digital or physical impression of the zone being restored without removing the cicatrisation element from the mouth, and thus without injuring the gum.

Thus, besides its first function of cicatrisation, described above, the cap performs a second function during the restoration process by allowing the advantageous definition of the shape of the restoration post and/or of the denture prior to its removal. This function is supplemental to its first function of cicatrisation since it allows no traumatizing of the gum after its cicatrisation in an advantageous chosen anatomical form.

For this, at the end of the cicatrisation phase of the dental restoration process, a practitioner can take a digital impression of the mouth of the patient, without removing the cicatrisation element (the cap). The digitization data, obtained by any instrument such as a buccal scanner, for example, are transmitted automatically to a computer having dental restoration software. This software comes with a man/machine interface by which an operator can indicate the cap model that it has used, or more generally the reference of the cicatrisation element, and optionally that of the implant and/or the post base used.

Using the digitization data, a software determines automatically the axis of the cicatrisation element, by geometrical construction, for example, based on the identification of the centre 15 of the cap and the direction perpendicular to the terminal surface 14 passing through this centre 15. By this construction, it can thus determine automatically the axis of the implant, without having to visualize it directly. In fact, the cicatrisation element is advantageously aligned with the implant, its axis being thus merged with that of the implant.

Next, since the geometry of the cicatrisation element corresponds to a unique positioning about its axis 18, or about the longitudinal axis L of the post base, in order to respect the buccal environment and in particular the geometry of the gum toward the inside of the mouth (lingual side) which differs from its geometry toward the outside (vestibular side), it is possible to deduce from its orientation the orientation of the axis of the connection device to the implant, for example, the connection device 3 of the post base to the implant: this makes it possible to deduce automatically therefrom the positioning of the connection device to the implant, without having to visualize it directly. As an example, it is possible to establish, during this construction, that one of the parallel sides of the trapezoidal shape of the visible surface 14 of the cap is parallel to a side of the hexagon of the fixation device of an implant.

Finally, in the event that there are cicatrisation elements of different height, it remains to determine this height, in order to position the invisible implant perfectly. A first approach might involve producing cicatrisation elements of different colour for different heights.

A second approach consists in arranging any indicator on the visible surface 14 of the cicatrisation element to indicate this height, this indicator possibly consisting of numbers and/or letters and/or any symbol and/or colours and/or laser markings and/or one or more bar codes and/or datamatrix codes and/or any identification code. A third approach might involve producing cicatrisation elements having a different visible surface 14 depending on their height. As an example, the caps A, B, C, D could retain the same shape but with slightly larger dimensions for greater heights, thus allowing them to be differentiated automatically and to determine their height.

Figure 20:
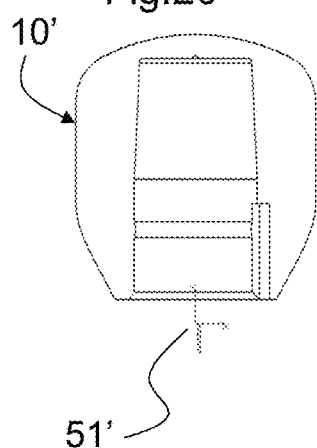
FIG. 20 shows a section view through a vertical median plane illustrating a first step of the restoration method according to one embodiment of the invention.

In a variant or supplemental embodiment, an operator enters by a man/machine interface the reference of the cicatrisation element, which allows the software to retrieve the characteristics of this cicatrisation element such as its height, its centre and/or axis, from a library present in the form of a database stored in an electronic memory which can be consulted. FIG. 20 illustrates as an example a virtual cap 10' memorized in the library associated with the restoration software. A reference in the space 51' is associated with the cap, allowing its positioning in space. As a variant, the software can automatically recognize the cicatrisation element from its geometrical characteristics, without manually entering its reference. An operator may assist a software in the proper positioning of the reference 51 of the actual cap, that is, in the recognition of its actual positioning, by entering one or more points of the emergent surface on an image obtained by the aforementioned digitization step and presented to the operator on a screen of a man/machine interface.

Figure 21:
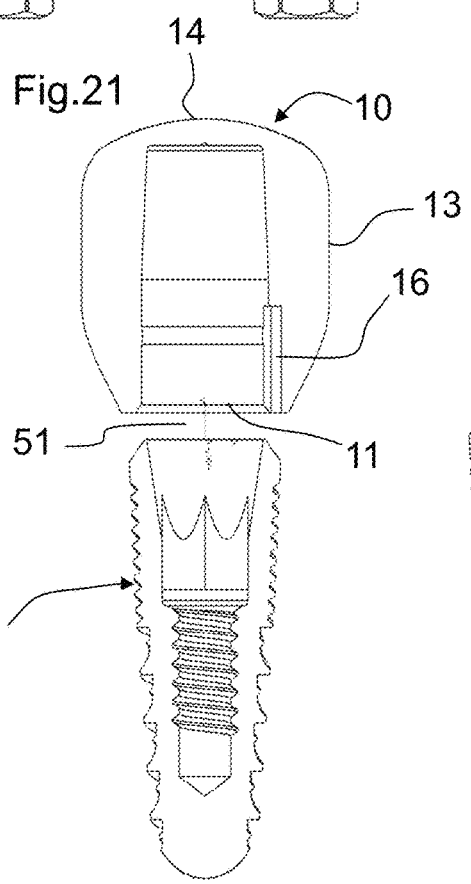
FIG. 21 shows a sectional view through a vertical median plane illustrating a second step of the restoration method according to the embodiment of FIG. 20.
Figure 22:
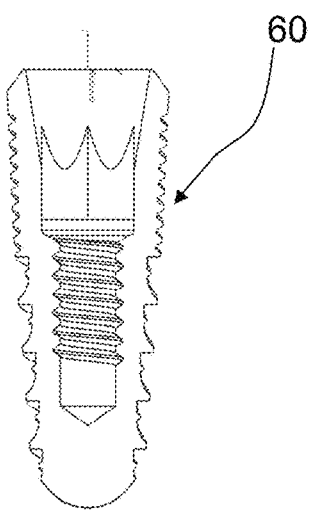
FIG. 22 shows a sectional view through a vertical median plane illustrating a third step of the restoration method according to the embodiment of FIG. 20.

Based on digitized data, and possibly with the help of one or more points of the surface of the cicatrisation element manually indicated by an operator, the software then is able to associate the virtual cicatrisation element obtained from its library with the digitized buccal environment, replacing the real cicatrisation element, in order to obtain a more perfect digital reproduction. It should be noted that the shape of the real cicatrisation element makes it possible to determine its orientation, especially on account of its asymmetrical shape, as previously noted. As shown in FIG. 21, the real reference 51 of the real cap 10 is thus determined automatically by the software. It is possible to perfectly position the virtual cicatrisation element on the digital impression, automatically or optionally with the aid of an intervention by an operator on a man/machine interface making it possible to visualize the buccal impression and the cicatrisation element. This perfect positioning of the virtual cicatrisation element makes it possible to deduce therefrom all the surrounding geometries, based on known references stored in the database associated with the precise cicatrisation element in question, including the position of the implant 60 and the geometry of the cicatrized gum without the presence of the cap 10, or that of the post base, as represented in FIG. 22.

When the restoration software has exactly repositioned the positioning of the hidden implant, it deduces from this knowledge the final geometry of the restoration post to be fabricated, which must be attached to the implant and occupy the entire gingival volume as defined by the cicatrisation element, and then the geometry of the denture which will be secured to this post, in known manner.

It should be noted that this restoration process can be done entirely digitally, therefore virtually, or it may involve phases of construction of a model in plastic or plaster. In the latter case, a physical impression, such as one made of silicone, can be taken, a plaster can be cast in the impression to create the master model, that is, a replica of the tooth arch being restored, which is then scanned in the laboratory to reconstruct a digital image.

As emerges from the above description, the last phase of the restoration process thus involves a restoration device, which comprises a central processing and control unit, here involving at least a microprocessor, connected to an electronic memory, on which a software is executed allowing the implementation of some or all of the steps of the restoration process described above. This central unit is linked by a communication device to a module for obtaining digital data representing some or all of a patient's dentition, which may consist of a device such as a buccal scanner. It is likewise linked to a man/machine interface, comprising for example a screen and/or a keyboard, to enable exchanges with an operator, as explained above. The central unit then performs all necessary processing, calculations, and other operations, by a surface means. Finally, it is able to generate and transmit fabrication commands to a device for fabrication of a restoration post and/or a denture. It may furthermore be linked by a second communication device to a fabrication device such as a machine tool.

The invention claimed is:

1. A method of fabricating a dental restoration post, designed to be secured to a dental implant at a first end and to receive a denture at its second end, wherein the method comprises:
   1) detecting a positioning of the dental implant for the fabrication of the dental restoration post, comprising:
      taking of a manual or digital impression of a buccal space of a patient, comprising a healing set which is secured to a dental implant, the healing set comprising a cicatrisation element surrounded at least partially by a gum of the patient and fixed on the implant; and
      automatically detecting the positioning of the implant, wherein:
      the cicatrisation element has a lateral surface designed to be integrated inside the gum of the patient in order to shape the gum during cicatrisation of the gum, and a terminal surface, a portion of the lateral surface and the terminal surface or a portion of the terminal surface forming together an emergent surface, designed to remain outside the gum, wherein at least one selected from the group consisting of
  (i) the terminal surface has an asymmetrical shape that, when projected on a plane substantially coincident with a gingival surface of the patient when in use, has a shape which is asymmetrical with respect to at least a median plane substantially perpendicular to the gingival surface, and
  (ii) the portion of the lateral surface in the emergent surface has an asymmetrical shape that results in a cross-section of the cicatrisation element at the lateral surface along a plane substantially parallel to a gingival surface of the patient when in use having a shape which is asymmetrical with respect to at least a median plane substantially perpendicular to the gingival surface, and
  the emergent surface of the cicatrisation element comprises a first portion designed for positioning and oriented toward the inside of the mouth and a second portion designed for positioning and oriented toward the outside of the mouth, wherein a shape of the first portion is different from a shape of the second portion,
  and wherein the automatic detecting of the positioning of the implant is performed by:
    identifying the asymmetrical shape of at least one selected from the group consisting of (i) the terminal surface, and (ii) the portion of the lateral surface in the emergent surface of the cicatrisation element outside the gum, and deducing the axis of the implant corresponding to an axis of the cicatrisation element from the asymmetrical shape, based on automatic geometrical construction or based on an association with a cicatrisation element memorized and stored in a database;
    identifying the asymmetrical shape of at least one selected from the group consisting of (i) the terminal surface, and (ii) the portion of the lateral surface in the emergent surface of the cicatrisation element outside the gum, and deducing the orientation of the implant from the asymmetrical shape, based on automatic geometrical construction or based on an association with a cicatrisation element memorized and stored in a database; and
    deducing the height of the implant from a determination of the height of the cicatrisation element, based on a color or an indicator of the emergent surface outside of the gum or based on an association with a cicatrisation element memorized in a database; and
  2) fabricating a dental restoration post adapted to the implant axis, orientation, and height identified or deduced in the automatic detecting.

2. The method according to claim 1, wherein the geometry of the continuous emergent surface of the cicatrisation element can take a single or a plurality of positionings relative to an axis of an implant, wherein each positioning includes axial orientation, rotational orientation, and height positioning of the emergent surface relative to the implant.

3. The method according to claim 1, wherein the emergent surface of the cicatrisation element is asymmetrical with respect to at least a median plane, wherein at least one selected from the group consisting of (i) the median plane is perpendicular to the emergent surface and passing through the centre of the emergent surface, and (ii) the median plane comprises a central axis of the cicatrisation element.

4. The method according to claim 1, wherein the terminal surface when projected on the plane substantially coincident with the gingival surface of the patient when in use and the cross-section of the cicatrisation element at the lateral surface along the plane substantially parallel to the gingival surface of the patient when in use have substantially the same shape.

5. The method according to claim 1, wherein the terminal surface or the emergent surface of the cicatrisation element comprises one side parallel to a planar surface of the implant, in order to deduce from the orientation of the cicatrisation element the orientation of the implant.

6. The method according to claim 1, wherein the cicatrisation element is fixed to a post base.

7. The method according to claim 6, wherein the cicatrisation element is integral with the post base forming a cicatrisation post.

8. The method according to claim 6, wherein the cicatrisation element and the post base form two distinct elements and are assembled in removable manner.

9. The method according to claim 8, wherein:
  the post base comprises a connection device to the implant and a connection device to the cicatrisation element, these two connection devices being arranged around an axis aligned with and coinciding with the longitudinal axis of the post base, and
  the cicatrisation element is arranged around a central axis aligned with the longitudinal axis of the post base.

10. The method according to claim 1, wherein the cross-section of the cicatrisation element at the lateral surface along the plane substantially parallel to the gingival surface of the patient when in use and/or the emergent surface of the cicatrisation element when projected on the plane substantially coincident with the gingival surface of the patient when in use have at least one selected from the group consisting of:
  a trapezoidal, polygonal, triangular, square, rectangular, ovoid shape, optionally with curved sides and/or with rounded corners; and
  a portion designed for positioning oriented toward the outside of the mouth with larger dimension than another portion designed for positioning oriented toward the inside of the mouth.

11. The method according to claim 1, wherein at least one selected from the group consisting of:
  the terminal surface of the emergent surface of the cicatrisation element has at least one selected from the group consisting of (i) a nonplanar, curved surface, and (ii) a convex surface,
  the portion of the lateral surface and the terminal surface or the portion of the terminal surface forming together the emergent surface of the cicatrisation element present a continuous surface with no opening of a through-bore passing through the cicatrisation element.

12. The method according to claim 11, wherein the emergent surface of the cicatrisation element has (a) no roughness, (b) no relief, (c) no hollow portion, (d) no groove, and (e) no ridge.

13. The method according to claim 1, wherein at least one selected from the group consisting of
  (i) the terminal surface or the emergent surface of the cicatrisation element comprises an indicator to indicate a height of the cicatrisation element, and
  (ii) the cicatrisation element has at least one of a color, a laser marking, one or more bar codes, and datamatrix codes to indicate a height of the cicatrisation element.

14. The method according to claim 1, wherein the cicatrisation element is selected from a series comprising at least two cicatrisation elements having different shapes, or from a series comprising at least three cicatrisation elements of different shapes, able to be secured to an implant of identical shape.

15. The method according to claim 1, wherein the axis of the implant corresponding to an axis of the cicatrisation element is identified based on an association with the cicatrisation element memorized and stored in the database, based on at least one selected from the group consisting of (i) a reference of the cicatrisation element entered through a man/machine interface, and (ii) an automatic recognition of the cicatrisation element by at least one selected from the group consisting of (a) a shape of the emergent portion and (b) manual entry of the positioning of a plurality of points of the emergent surface on a graphic representation on a man/machine interface.

16. The method according to claim 1, wherein the orientation of the implant is identified based on an association with the cicatrisation element memorized in the database, based on at least one selected from the group consisting of (i) a reference of the cicatrisation element entered through a man/machine interface, and (ii) an automatic recognition of the cicatrisation element by at least one selected from the group consisting of (a) a shape of the emergent portion and (b) manual entry of the positioning of a plurality of points of the emergent surface on a graphic representation on a man/machine interface.

17. The method according to claim 1, wherein the height of the implant is identified by determination of the height of the cicatrisation element, based on an association with the cicatrisation element memorized in the database, based on at least one selected from the group consisting of (i) a reference of the cicatrisation element entered through a man/machine interface, and (ii) an automatic recognition of the cicatrisation element by at least one selected from the group consisting of (a) a shape of the emergent portion and (b) manual entry of the positioning of a plurality of points of the emergent surface on a graphic representation on a man/machine interface.

18. A method of fabricating a dental restoration post, designed to be secured to a dental implant at a first end and to receive a denture at its second end, wherein the method comprises:
1) Detecting a positioning of the dental implant for the fabrication of the dental restoration post, comprising:
taking of a manual or digital impression of a buccal space of a patient, comprising a healing set which is secured to a dental implant, the healing set comprising a cicatrisation element surrounded at least partially by a gum of the patient and fixed on the implant; and
automatically detecting the positioning of the implant, wherein:
the cicatrisation element has a lateral surface designed to be integrated inside the gum of the patient in order to shape the gum during cicatrisation of the gum, and a terminal surface, a portion of the lateral surface and the terminal surface or a portion of the terminal surface forming together an emergent surface, designed to remain outside the gum, wherein at least one selected from the group consisting of
(i) the terminal surface has an asymmetrical shape that, when projected on a plane substantially coincident with a gingival surface of the patient when in use, has a shape which is asymmetrical with respect to at least a median plane substantially perpendicular to the gingival surface, and
(ii) the portion of the lateral surface in the emergent surface has an asymmetrical shape that results in a cross-section of the cicatrisation element at the lateral surface along a plane substantially parallel to a gingival surface of the patient when in use having a shape which is asymmetrical with respect to at least a median plane substantially perpendicular to the gingival surface, and
the cross-section of the cicatrisation element at the lateral surface along the plane substantially parallel to the gingival surface of the patient when in use and/or the emergent surface of the cicatrisation element when projected on the plane substantially coincident with the gingival surface of the patient when in use have a portion designed for positioning oriented toward the outside of the mouth with larger dimension than another portion designed for positioning oriented toward the inside of the mouth,
and wherein the automatic detecting of the positioning of the implant is performed by:
identifying the asymmetrical shape of at least one selected from the group consisting of (i) the terminal surface, and (ii) the portion of the lateral surface in the emergent surface of the cicatrisation element outside the gum, and deducing the axis of the implant corresponding to an axis of the cicatrisation element from the asymmetrical shape, based on automatic geometrical construction or based on an association with a cicatrisation element memorized and stored in a database;
identifying the asymmetrical shape of at least one selected from the group consisting of (i) the terminal surface, and (ii) the portion of the lateral surface in the emergent surface of the cicatrisation element outside the gum, and deducing the orientation of the implant from the asymmetrical shape, based on automatic geometrical construction or based on an association with a cicatrisation element memorized and stored in a database; and
deducing the height of the implant from a determination of the height of the cicatrisation element, based on a color or an indicator of the emergent surface outside of the gum or based on an association with a cicatrisation element memorized in a database; and
2) Fabricating a dental restoration post adapted to the implant axis, orientation, and height identified or deduced in the automatic detecting.

19. A method of fabricating a dental restoration post, designed to be secured to a dental implant at a first end and to receive a denture at its second end, wherein the method comprises:
1) Detecting a positioning of the dental implant for the fabrication of the dental restoration post, comprising:
taking of a manual or digital impression of a buccal space of a patient, comprising a healing set which is secured to a dental implant, the healing set comprising a cicatrisation element surrounded at least partially by a gum of the patient and fixed on the implant; and
automatically detecting the positioning of the implant, wherein:
the cicatrisation element has a lateral surface designed to be integrated inside the gum of the patient in order to shape the gum during cicatrisation of the gum, and a terminal surface, a portion of the lateral surface and the terminal surface or a portion of the terminal surface forming together an emergent surface, designed to remain outside the gum, wherein at least one selected from the group consisting of
(i) the terminal surface has an asymmetrical shape that, when projected on a plane substantially coincident with a gingival surface of the patient when in use, has a shape which is asymmetrical with respect to at least a median plane substantially perpendicular to the gingival surface, and
(ii) the portion of the lateral surface in the emergent surface has an asymmetrical shape that results in a cross-section of the cicatrisation element at the lateral surface along a plane substantially parallel to a gingival surface of the patient when in use having a shape which is asymmetrical with respect to at least a median plane substantially perpendicular to the gingival surface, and
the cross-section of the cicatrisation element at the lateral surface along the plane substantially parallel to the gingival surface of the patient when in use and/or the emergent surface of the cicatrisation element when projected on the plane substantially coincident with the gingival surface of the patient when in use have a trapezoidal, polygonal, triangular, square, rectangular, or ovoid shape,
and wherein the automatic detecting of the positioning of the implant is performed by:
identifying the asymmetrical shape of at least one selected from the group consisting of (i) the terminal surface, and (ii) the portion of the lateral surface in the emergent surface of the cicatrisation element outside the gum, and deducing the axis of the implant corresponding to an axis of the cicatrisation element from the asymmetrical shape, based on automatic geometrical construction or based on an association with a cicatrisation element memorized and stored in a database;
identifying the asymmetrical shape of at least one selected from the group consisting of (i) the terminal surface, and (ii) the portion of the lateral surface in the emergent surface of the cicatrisation element outside the gum, and deducing the orientation of the implant from the asymmetrical shape, based on automatic geometrical construction or based on an association with a cicatrisation element memorized and stored in a database; and
deducing the height of the implant from a determination of the height of the cicatrisation element, based on a color or an indicator of the emergent surface outside of the gum or based on an association with a cicatrisation element memorized in a database; and
2) Fabricating a dental restoration post adapted to the implant axis, orientation, and height identified or deduced in the automatic detecting.

20. The method according to claim 19, wherein the trapezoidal, polygonal,
triangular, square, rectangular, or ovoid shape has curved sides and/or rounded corners.

* * * * *